United States Patent
Tsai et al.

(10) Patent No.: US 11,195,045 B2
(45) Date of Patent: Dec. 7, 2021

(54) METHOD FOR REGULATING POSITION OF OBJECT

(71) Applicant: GETAC TECHNOLOGY CORPORATION, Hsinchu County (TW)

(72) Inventors: Kun-Yu Tsai, Taipei (TW); Po-Yu Yang, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 33 days.

(21) Appl. No.: 16/848,565

(22) Filed: Apr. 14, 2020

(65) Prior Publication Data

US 2020/0364483 A1 Nov. 19, 2020

Related U.S. Application Data

(60) Provisional application No. 62/848,216, filed on May 15, 2019.

(51) Int. Cl.
*G06T 7/586* (2017.01)
*G06T 7/00* (2017.01)
(Continued)

(52) U.S. Cl.
CPC .......... *G06K 9/4661* (2013.01); *G01J 3/2823* (2013.01); *G01N 21/3581* (2013.01); *G01N 21/8851* (2013.01); *G01N 21/956* (2013.01); *G06F 17/16* (2013.01); *G06K 9/00201* (2013.01); *G06K 9/00208* (2013.01); *G06K 9/2018* (2013.01); *G06K 9/2054* (2013.01); *G06K 9/3208* (2013.01); *G06K 9/3233* (2013.01); *G06K 9/6257* (2013.01); *G06N 3/04* (2013.01); *G06N 3/0472* (2013.01); *G06N 3/063* (2013.01); *G06N 3/08* (2013.01); *G06T 7/0004* (2013.01); *G06T 7/11* (2017.01); *G06T 7/40* (2013.01); *G06T 7/45* (2017.01); *G06T 7/586* (2017.01); *G06T 7/97* (2017.01); *G01N 2021/8887* (2013.01); *G06T 2207/10152* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 2003/0021603 A1* | 1/2003 | Engel | H04N 5/23212 396/429 |
|---|---|---|---|
| 2015/0170378 A1* | 6/2015 | Moran | G06K 9/4604 348/135 |

* cited by examiner

*Primary Examiner* — Idowu O Osifade

(57) ABSTRACT

A method for regulating a position of an object includes detecting a plurality of first alignment structures of the object under rotation of the object, wherein a plurality of second alignment structures of the object sequentially face a photosensitive element during the rotation of the object, and when the plurality of first alignment structures have reached a first predetermined state, stopping the rotation of the object and performing an image capturing procedure of the object. The image capturing procedure includes: capturing a test image of the object, wherein the test image includes an image block presenting the second alignment structure currently facing the photosensitive element; detecting the position of the image block in the test image; when the image block is located in the middle of the test image, capturing a detection image of the object.

14 Claims, 11 Drawing Sheets

(51) Int. Cl.
*G06N 3/08* (2006.01)
*G06T 7/40* (2017.01)
*G06T 7/11* (2017.01)
*G06T 7/45* (2017.01)
*G06N 3/063* (2006.01)
*G06K 9/46* (2006.01)
*G06K 9/00* (2006.01)
*G06K 9/20* (2006.01)
*G06K 9/32* (2006.01)
*G06K 9/62* (2006.01)
*G01N 21/3581* (2014.01)
*G01N 21/88* (2006.01)
*G06N 3/04* (2006.01)
*G01J 3/28* (2006.01)
*G01N 21/956* (2006.01)
*G06F 17/16* (2006.01)

METHOD FOR REGULATING POSITION OF OBJECT

CROSS-REFERENCE TO RELATED APPLICATIONS

This application claims priority from U.S. Patent Application Ser. No. 62/848,216, filed on May 15, 2019, the entire disclosure of which is hereby incorporated by reference.

BACKGROUND OF THE INVENTION

Field of the Invention

The present invention relates to an object surface detection system, and more particularly to a method for regulating a position of an object for an object surface detection system.

Description of the Prior Art

Product defect detection is a critical step in the industrial manufacturing process. Defective products cannot be sold, otherwise malfunctioning final products can be resulted if defective intermediate products are sold to other manufacturers for processing. One conventional defect detection method is manually inspecting a product under test by naked eye or by touching of hands, so as to determine whether a product contains defects, such as recesses, scratches, color differences or damages. However, manually inspecting whether a product contains defects yields less satisfactory efficiency, and has a greater probability of misjudgment, leading to the problem of an unmanageable product yield rate.

SUMMARY OF THE INVENTION

In one embodiment, a method for regulating a position of an object is suitable for regulating the position of the object. The method for regulating a position of an object includes detecting a plurality of first alignment structures under rotation of the object, wherein a plurality of second alignment structures of the object sequentially face a photosensitive element during the rotation of the object, and stopping the rotation of the object and performing an image capture procedure of the object when the plurality of the first alignment structures have reached a predetermined state. The step of performing image capturing procedure of the object includes: capturing a test image of the object by the photosensitive element, wherein the test includes an image block presenting the second alignment structure currently facing the photosensitive element; detecting a presentation position of the image block in the test image; when the presentation position is located in the middle of the test image, capturing a detection image of the object by the photosensitive element; and when the presentation position is not located in the middle of the test image, moving the object in a first direct, and returning to the step of capturing the test image of the object by the photosensitive element.

In one embodiment, a method for regulating a position of an object is suitable for regulating the position of the object. The method for regulating a position of an object includes: sequentially moving a plurality of areas on a surface of the object to a detection position, wherein the object has a plurality of alignment structures; capturing a detection image of each of the areas sequentially located at the detections position by a photosensitive element, wherein the photosensitive element faces the detection position and the plurality of alignment structures are located within a viewing angle of the photosensitive element; combining the plurality of detection images corresponding to the plurality of areas into an object image; comparing the object image with a predetermined pattern; and if the object image does not match the predetermined pattern, adjusting a sequence of combining the plurality of detection images.

In conclusion, the method for regulating a position of an object according to embodiments of the present invention uses images to analyze a presentation type and a presentation position of a specific structure of the object in the test image to determine whether the object is aligned, thereby capturing a detection image of each of the areas on the surface located at the same position according to the aligned object. Thus, an artificial neural network system can build a more accurate predictive model according to the detection images of the same position, further reducing the possibility of misjudgment.

DETAILED DESCRIPTION OF THE EMBODIMENTS

Figure 1:
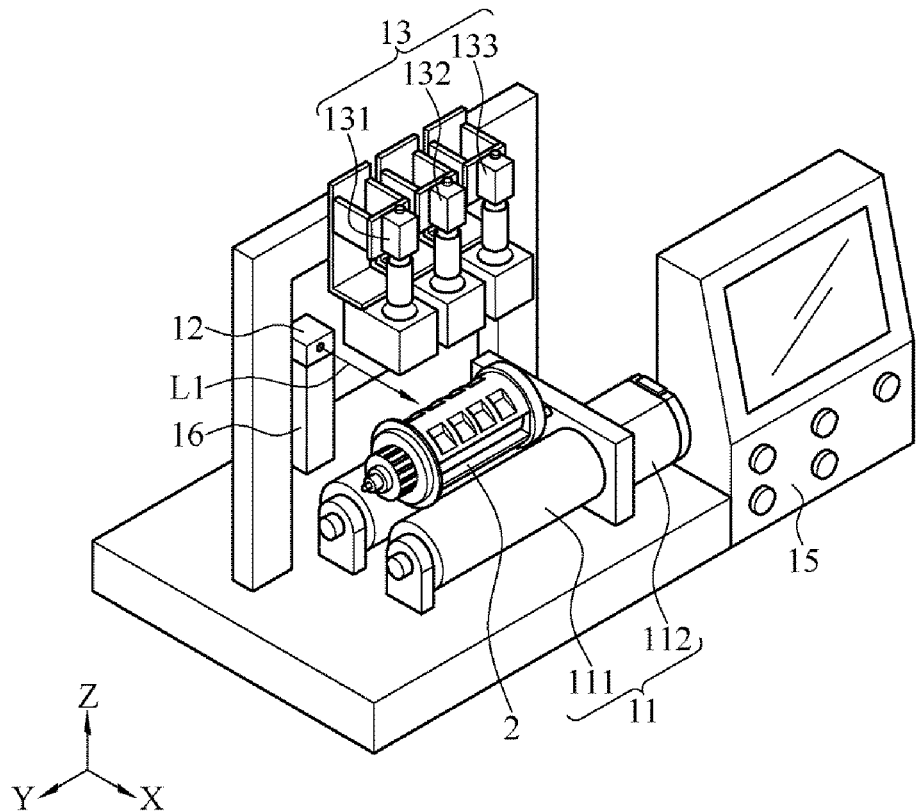
FIG. 1 is a schematic diagram of an object surface detection system according to an embodiment of the present invention.

Referring to FIG. 1, an object surface detection system is suitable for scanning an object 2 to obtain at least one detection image of the object 2. In some embodiments, the surface of the object 2 can have at least one surface type, and an image block presenting the surface type is also presented in a corresponding detection image. Herein, the surface type is a three-dimensional fine structure. Herein, the three-dimensional fine structure is in a scale of submicron (μm); That is, the longest side or the longest diameter of the three-dimensional fine structure is in a scale between submicron and micron. Wherein, submicron refers to <1 μm, e.g., 0.1 μm to 1 μm. For example, the three-dimensional fine structure is a micro-structure of 300 nm to 6 μm. In some embodiments, the surface type can be, for example, surface structures such as slots, cracks, bumps, sand holes, air holes, bump marks, scratches, edge and textures.

Referring to FIG. 1 to FIG. 4, the object surface detection system includes a driver component 11, a light source component 12, a photosensitive element 13 and a processor 15. The processor 15 is coupled to the driver component 11, the light source component 12 and the photosensitive element 13. The light source component 12 and the photosensitive element 13 face a detection position 14 on the driver component 11. The driver component 11 carries the object 2 to be tested. The object 2 has a surface 21, and the surface 21 of the object 2 is divided along an extension direction (to be referred to as a first direction D1) of the surface 21 of the object 2 into a plurality of areas. In some embodiment, assuming that the surface 21 of the object 2 is divided into nine areas for example, three exemplary areas 21A to 21C are denoted in the drawings. However, the present invention is not limited to the above example. The surface 21 of the object 2 can also be divided into areas of other quantities according to actual requirements, for example, any quantity such as 3, 5, 11, 15 or 20.

Figure 5:
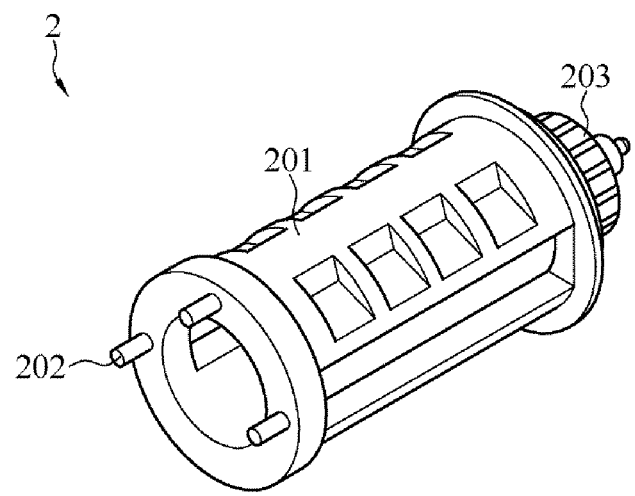
FIG. 5 is a schematic diagram of an implementation of an object.
Figure 6:
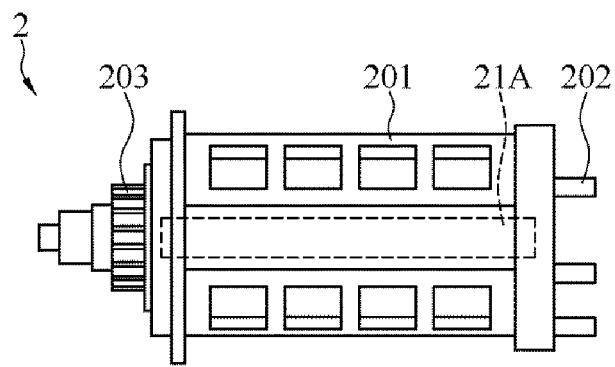
FIG. 6 is a top view of the object in FIG. 5.

In some embodiments, referring to FIG. 5 and FIG. 6, the object 2 includes a body 201, a plurality of first alignment structures 202 and a plurality of second alignment structures 203. The first alignment structures 202 are located on one end of the body 201, and the second alignment structures 203 are located on the other end of the body 201. In some embodiments, the first alignment structures 202 can be structures such as columns, bumps or slots; the second alignment structures 203 can be structures such as columns, bumps or slots. In some embodiments, the second alignment structures 203 are arranged at intervals along the extension direction (i.e., the first direction D1) of the surface 21 of the body 201, and the distance between any two adjacent of the second alignment structures 203 is more than or equal to a viewing angle of the photosensitive element 13. In some embodiments, the second alignment structures 203 respectively correspond the areas 21A to 21C of the object 2. Each of the second alignment structures 203 is aligned to the middle of the side of the corresponding area along the first direction D1.

The first alignment structures 202 are exemplified by columns (to be referred to as alignment columns), and the second structures 203 are exemplified by slots (to be referred to as alignment slots) in the description below. In some embodiments, the extension direction of each alignment column is substantially identical to the extension direction of the body 201, and one end of each column is coupled to one end of the body 201. The alignment slots are located on the other end of the body 201, and encircle the body 201 by regarding the long axis of the body 201 as a rotation axis and are arranged at intervals on surface of the other end of the body 201.

In some embodiments, the first alignment structures 202 are arranged at intervals on the body 201. In this example, three first alignment structures 202 are taken as an example; however, the present invention is not limited to the quantity above. By viewing the side of the body 201 from the top, when rotated by regarding the long axis of the body 201 as a rotation axis, the first alignment structures 202 present different relative positions; for example, the first alignment structures 202 are arranged at intervals in a non-overlapping manner (as shown in FIG. 6), or any two first alignment structures 202 overlap but the remaining one first alignment structure 202 does not overlap.

Referring to FIG. 1 to FIG. 8, the object surface detection system can perform an image capturing procedure. In the image capturing procedure, the object 2 is carried on the driver component 11, and one of the surfaces 21A to 21C of the object 2 is substantially located at the detection position 14. Herein, each time before an image is captured, the object surface detection system performs alignment once (that is, fine tuning the position of the object 2), such that the area is aligned to the viewing angle of the photosensitive element 13.

In the image capturing procedure, under the lighting of the light source component 12, the processor 15 controls the photosensitive element 13 to capture a test image of the object 2 (step S11). Herein, the test image includes an image block of the second alignment structure 203 currently facing the photosensitive element 13.

The processor 15 detects a presentation position of the image block presenting the second alignment structure 203 in the test image (step S12), so as to determine whether the area currently located at the detection position 14 is aligned to the viewing angle of the photosensitive element 13.

When the presentation position of the image block is not located in the middle of the test image, the processor 15 controls the driver component 11 to fine tune the position of the object 2 in the first direction D1 (step S13), and returns to and subsequently performs step S11. Herein, step S11 to step S13 are repeatedly performed until the processor 15 detects that the presentation position of the image block is located in the middle of the test image.

When the presentation position of the image block is located in the middle of the test image, the processor 15 drives the photosensitive element 13 to perform image capturing; at this point, under the lighting of the light source component 12, the photosensitive element 13 captures a detection image of the area of the object 2 (step S14).

Next, the processor 15 controls the driver component 11 to move the next area of the object 2 in the first direction to the detection position 14, so as to have the next second alignment structure 203 face the photosensitive element 13 (step S15), and returns to and subsequently performs step S11. Herein, step S11 to step S15 are repeatedly performed until the detection images of all the areas of the object 2 have been captured. In some embodiments, an amplitude by which the driver component 11 fine tunes the object 2 is less than an amplitude by which it moves the next area of the object 2.

For example, assume that the object 2 has three areas, and the photosensitive element 13 faces the area 21A of the object 2 at the beginning of the image capturing procedure.

At this point, under the lighting of the light source component 12, the photosensitive element 13 first captures a test image (to be referred to as a first test image) of the object 2. The first test image includes an image block (to be referred to as a first image block) presenting the second alignment structure 202 corresponding to the area 21A. Next, the processor 15 performs image analysis of the first test image to detect a presentation position of the first image block in the first test image. When the presentation position of the first image block is not located in the middle of the first test image, the driver component 11 fine tunes the position of the object 2 in the first direction D1. After fine-tuning, the photosensitive element 13 again captures the first test image for the processor 15 to determine whether the presentation position of the first image block is located in the middle of the first test image. Conversely, when the presentation position of the first image block is located in the middle of the first test image, the photosensitive element 13 captures, under the lighting of the light source component 12, the detection image of the area 21A of the object 2. After capturing, the driver component 11 moves the next area 21B of the object 2 in the first direction D1 to the detection position 14, so as to have the second alignment structure 203 corresponding to the area 21B face the photosensitive element 13. Next, under the lighting of the light source component 12, the photosensitive element 13 again captures the test image (to be referred to as a second test image) of the object 2, wherein the second test image includes an image block (to be referred to as a second image block) presenting the second alignment structure 203 corresponding to the area 21B. Next, the processor 15 performs image analysis of the second test image to detect the presentation position of the second image block in the second test image. When the presentation position of the second image block is not located in the middle of the second test image, the driver component 11 fine tunes the position of the object 2 in the first direction D1. After fine-tuning, the photosensitive element 13 again captures the second test image for the processor 15 to determine whether the presentation position of the second image block is located in the middle of the second test image. Conversely, when the presentation position of the second image block is located in the middle of the second test image, the photosensitive element 13 captures, under the lighting of the light source component 12, the detection image of the area 21B of the object 2. After capturing, the driver component 11 moves the next area 21C of the object 2 in the first direction D1 to the detection position 14, so as to have the second alignment structure 203 corresponding to the area 21C face the photosensitive element 13. Next, under the lighting of the light source component 12, the photosensitive element 13 again captures the test image (to be referred to as a third test image) of the object 2, wherein the third test image includes an image block (to be referred to as a third image block) presenting the second alignment structure 203 corresponding to the area 21C. Next, the processor 15 performs image analysis of the third test image to detect the presentation position of the third image block in the third test image. When the presentation position of the third image block is not located in the middle of the third test image, the driver component 11 fine tunes the position of the object 2 in the first direction D1. After fine-tuning, the photosensitive element 13 again captures the third test image for the processor 15 to determine whether the presentation position of the third image block is located in the middle of the third test image. Conversely, when the presentation position of the third image block is located in the middle of the third test image, the photosensitive element 13 captures, under the lighting of the light source component 12, the detection image of the area 21C of the object 2.

In some embodiments, when the object surface detection system needs to capture an image of an object 2 by using two different image capturing parameters, the object surface detection system performs the image capturing procedure once by sequentially using one image capturing parameter. The different image capturing parameters can provide the light source component 12 with light L1 of different brightness levels, enable the light source component 12 to provide lighting with different light incident angles, or provide the light source component 12 with light L1 having different spectra.

Figure 7:
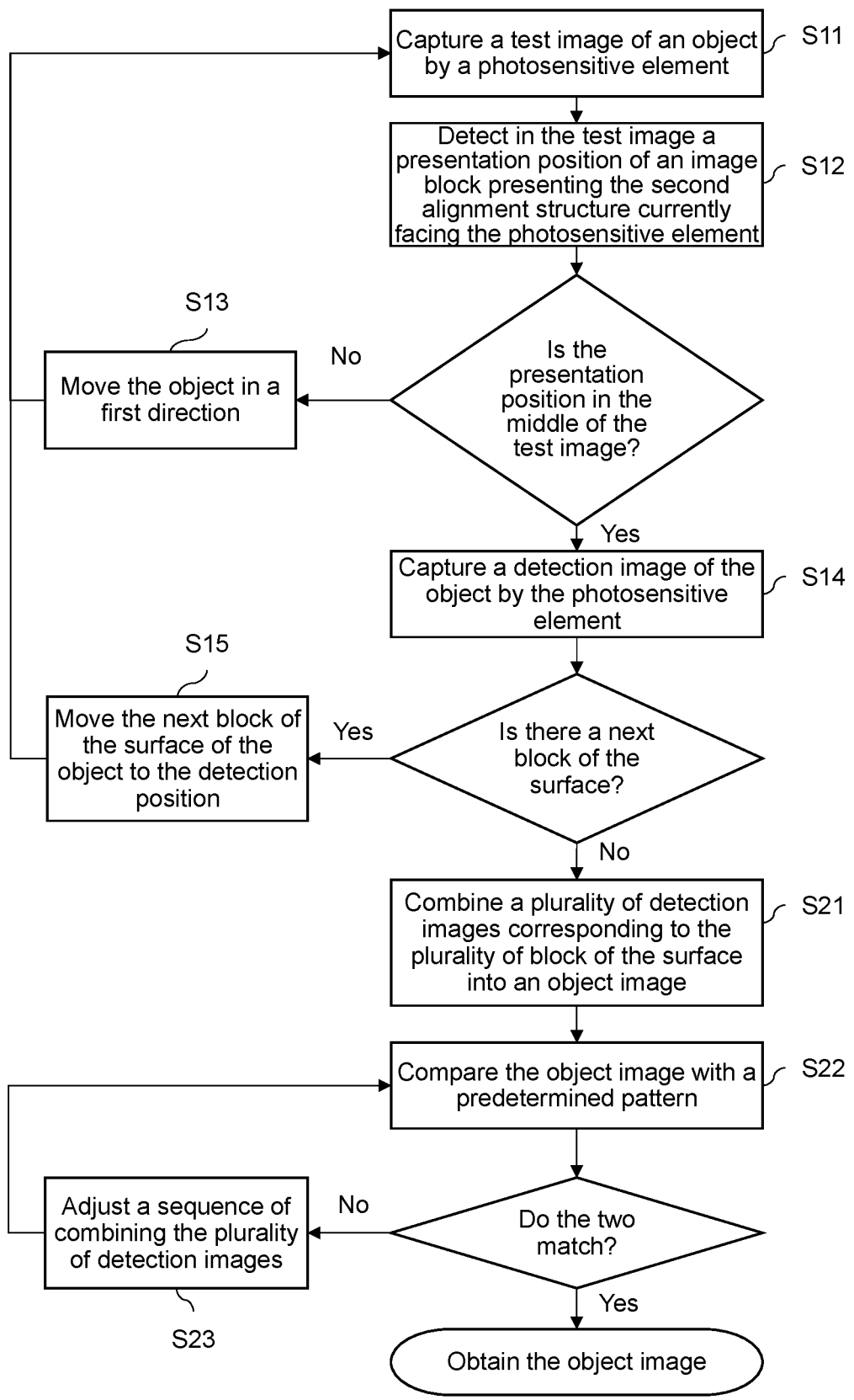
FIG. 7 is a flowchart of a method for regulating a position of an object according to an embodiment of the present invention.

In some embodiments, referring to FIG. 7, upon having captured the detection images of all the areas 21A to 21C of the object 2, the processor 15 combines the detection images of the all of the areas 21A to 21C of the object 2 according to a capturing sequence into an object image (step S21), and compares the combined object image with a predetermined pattern (step S22). If the object image does not match the predetermined pattern, the processor 15 adjusts a sequence of combining the detection images (step S23), and again performs the step of comparing (step S22). Conversely, if the object image matches the predetermined pattern, the processor 15 obtains the object image of the object 2.

In some embodiments, the object surface detection system can further perform a position regulation procedure. After the object 2 is placed on the driver component 11, the object surface detection system performs the position regulation procedure to regulate the position of the object to thereby determine a position at which image capturing starts for the object 2.

Figure 8:
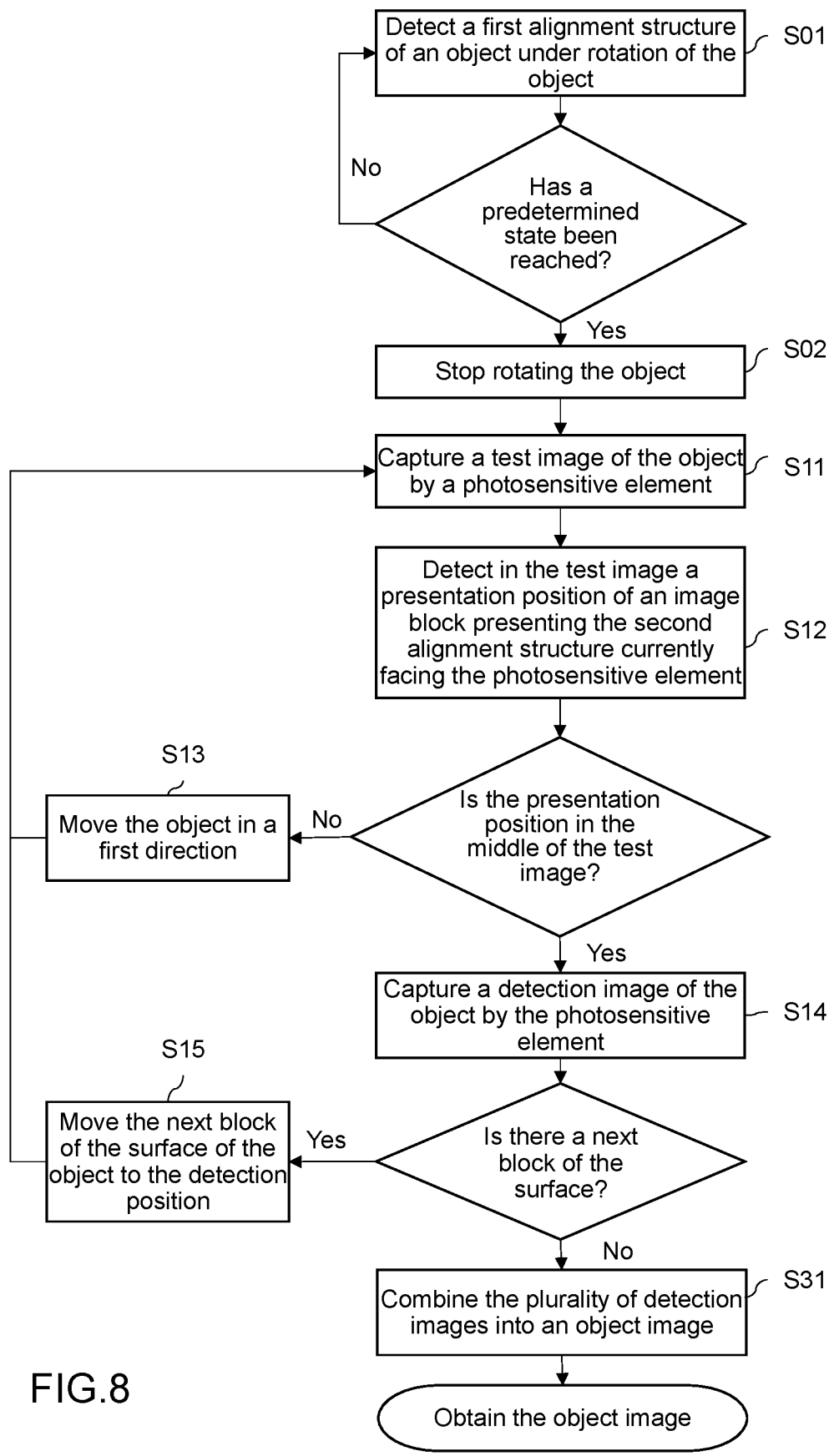
FIG. 8 is a flowchart of a method for regulating a position of an object according to another embodiment of the present invention.

Referring to FIG. 8, in the position regulation procedure, the driver component 11 continuously rotates the object 2, and under rotation of the object 2, the processor 15 detects the first alignment structures 202 of the object 2 by using the photosensitive element 13 (step S01), so as to determine whether the first alignment structures 202 have reached a predetermined state. Herein, during the rotation of the object 2, the second alignment structures 203 of the object 2 sequentially face the photosensitive element 13.

In some embodiments, the predetermined state can be relative positions of the first alignment structures 202, and/or a brightness relationship of the image blocks of the first alignment structures 202.

In one example, under the rotation of the object 2, the photosensitive element 13 continuously captures the detection image of the object 2, wherein the detection image includes the image block presenting the first alignment structure 202. The processor 15 analyzes the detection images to determine the relative positions among the image blocks of the first alignment structures 202 in the detection image, and/or the brightness relationship of the image blocks of the first alignment structures 202 in the detection image. For example, the processor 15 analyzes the detection image and discovers that, the image blocks of the first alignment structures 202 are spaced from one another and are non-overlapping and the brightness of the middle image block among the image blocks of the first alignment structures 202 is higher than the brightness of the second image blocks on the two sides; at this point, the processor 15 determines that the first alignment structures 202 have reached the predetermined state. In other words, the predetermined state is set by image characteristics of a predetermined structure of the object 2.

When the first alignment structures 202 have reached the predetermined state, the processor 15 stops rotating the object (step S02) and performs the image capturing procedure of the object. That is, the processor 15 controls the driver component 11 to stop rotating the object 2. Conversely, capturing of the detection image is continued and an imaging position and/or an imaging state of the image blocks of the first alignment structures 202 are/is analyzed.

In some embodiments, when the object surface detection system has a position regulation procedure, upon having captured the detection images of all the areas 21A to 21C of the object 2, the processor 15 can combine, according to the capturing sequence, the detection images captured into an object image of the object 2 (step S31).

Figure 9:
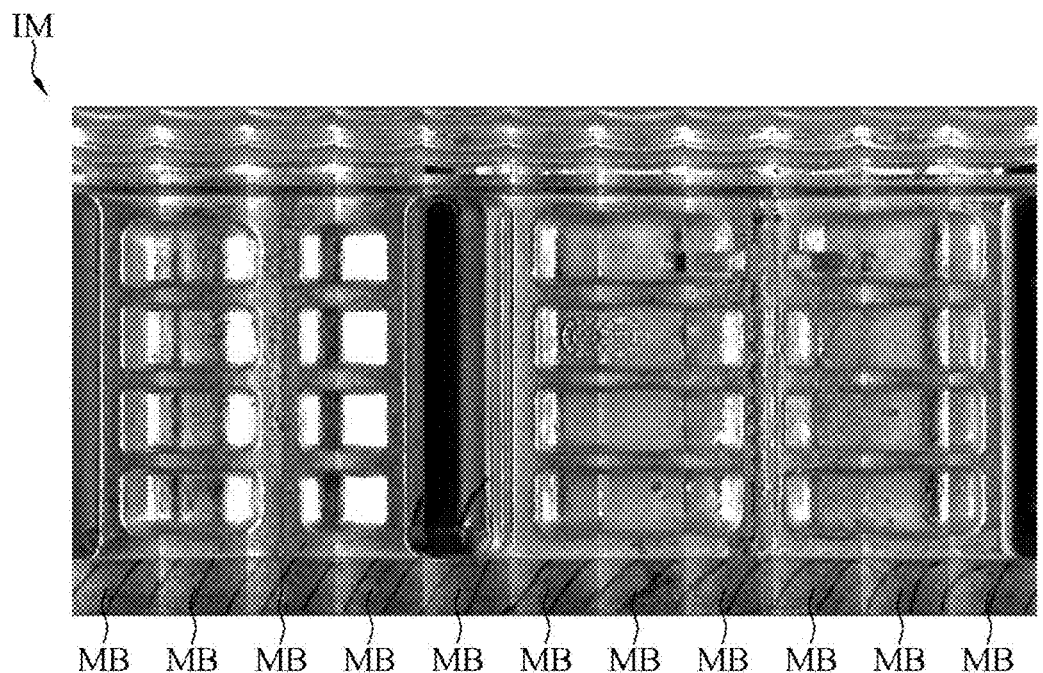
FIG. 9 is a schematic diagram of an object image according to an embodiment.

For example, taking the spindle shown in FIG. 5 and FIG. 6 for example, after the object surface detection system performs the image capturing procedure (that is, repeating step S11 to S15), the photosensitive element 13 can capture detection images MB of all the areas 21A to 21C. Herein, the processor 15 can combine the detection images MB of all the areas 21A to 21C according to the capturing sequence into an object image IM of the object 2, as shown in FIG. 9. In this example, the photosensitive element 13 can be a linear photosensitive element. At this point, the detection images MB captured by the photosensitive element 13 can be combined by the processor 15 without any cropping. In some embodiments, the linear photosensitive element can be implemented by a linear image sensor. Wherein, the linear image sensor can have a field of view (FOV) of approximately 0 degree.

Figure 10:
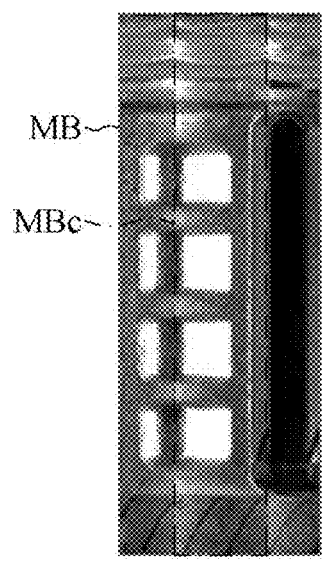
FIG. 10 is a schematic diagram of a detection image according to an embodiment.

In another embodiment, the photosensitive element 13 is a two-dimensional photosensitive element. At this point, upon having captured the detection images MB of all the areas 21A to 21C by the photosensitive element 13, the processor 15 captures, based on the short sides of the detection images MB, middle regions MBc of the detection images MB, as shown in FIG. 10. Then, the processor 15 combines the middle regions MBc corresponding to all the areas 21A to 21C into the object image IM. In some embodiments, the middle sections MBc can have a width of, for example, one pixel. In some embodiments, the two-dimensional photosensitive element can be implemented by a planar image sensor. Wherein, the planar image sensor can have a field of view of approximately 5 degrees to 30 degrees.

In some embodiments, the object surface detection system can further include a test procedure. In other words, before the position regulation procedure and the image capturing procedure are performed, the object surface detection system can first perform a test procedure, so as to confirm that all the components (e.g., the driver component 11, the light source component 12 and the photosensitive element 13) are functional.

Figure 11:
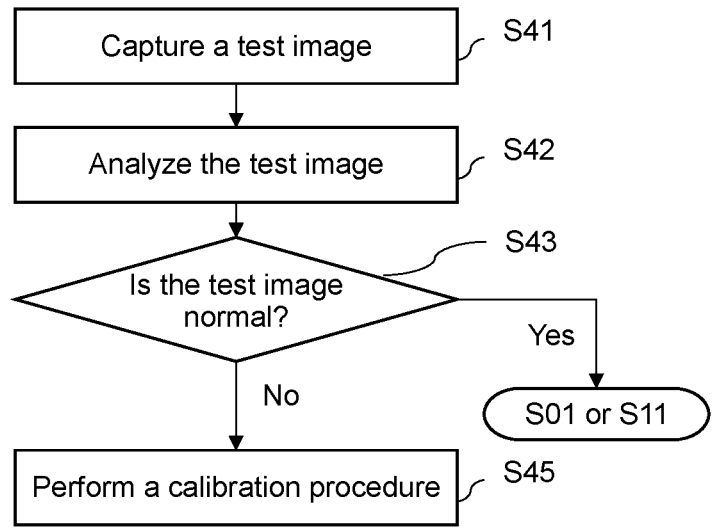
FIG. 11 is a flowchart of a test procedure according to an embodiment.

In the test procedure, referring to FIG. 11, the photosensitive element 13 captures, under the lighting of the light source component 12, a test image (step S41). The processor 15 receives the test image captured by the photosensitive element 13, and the processor 15 analyzes the test image (step S42) to determine whether the test image is normal (S43) and then accordingly determines whether the test is complete. If the test image is normal (a determination result of "yes"), it means that the photosensitive element 13 can capture a normal detection image in step S41 of the detection procedure, and at this point, the object surface detection system continues to the position regulation procedure (continuing to perform step S01) or continues to perform the image capturing procedure (continuing to perform step S11).

If the test image is abnormal (a determination result of "no"), the object surface detection system can perform a calibration procedure (step S45).

Figure 2:
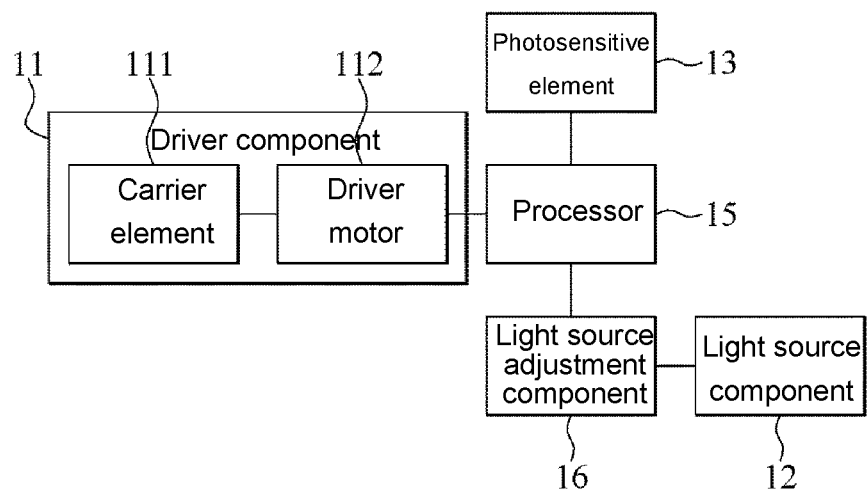
FIG. 2 is a function block diagram of an object surface detection system according to an embodiment of the present invention.

In some embodiments, referring to FIG. 1 and FIG. 2, the object surface detection system can further include a light source adjustment component 16, which is coupled to the light source component 12. Herein, the light source adjustment component 16 can be used for adjusting the position of the light source component 12 so as to change a light incident angle θ.

In one example, referring to FIG. 1, FIG. 2 and FIG. 11, the photosensitive element 13 can capture an area currently located at the detection position 14 as a test image (step S41). At this point, the processor 15 analyzes the test image (step S42) to determine whether average brightness of the test image satisfies predetermined brightness to determine whether the test image is normal (step S43). If the average brightness level of the test image does not satisfy the predetermined brightness (a determination result of "no"), it means that the test image is abnormal. For example, when the light incident angle θ of the light source component 12 is inappropriate, the average brightness of the test image does not satisfy the predetermined brightness; at this point, the test image cannot correctly present a predetermined surface type of the object 2 expected to be detected.

During the calibration procedure, the processor 15 controls the light source adjustment component 16 to again adjust the position of the light source component 12 and again set the light incident angle θ (step S45). After the light source adjustment component 16 again adjusts the position of the light source component 12 (step S45), the light source component 12 emits another test light having a different light incident angle θ. At this point, the processor 15 controls the photosensitive element 13 to capture, according to the another test light, an image of an area current located at the detection position 14 to generate another test image (step S41), and the processor 15 can analyze the another test image (step S42) to determine whether the average brightness of the another test image satisfies the predetermined brightness (step S43). If the brightness of the another test image still does not satisfy the predetermined brightness (a determination result of "no"), the processor 15 controls the light source adjustment component 16 to again adjust the position of the light source component 12 and again adjust the light incident angle θ (step S41), until the average brightness of the test image captured by the photosensitive element 13 satisfies the predetermined brightness. If the average brightness of the test image satisfies the predetermined brightness (a determination result of "yes"), the object surface detection system continues to subsequent step S01 or S11 to perform the position regulation procedure or the image capturing procedure.

Figure 12:
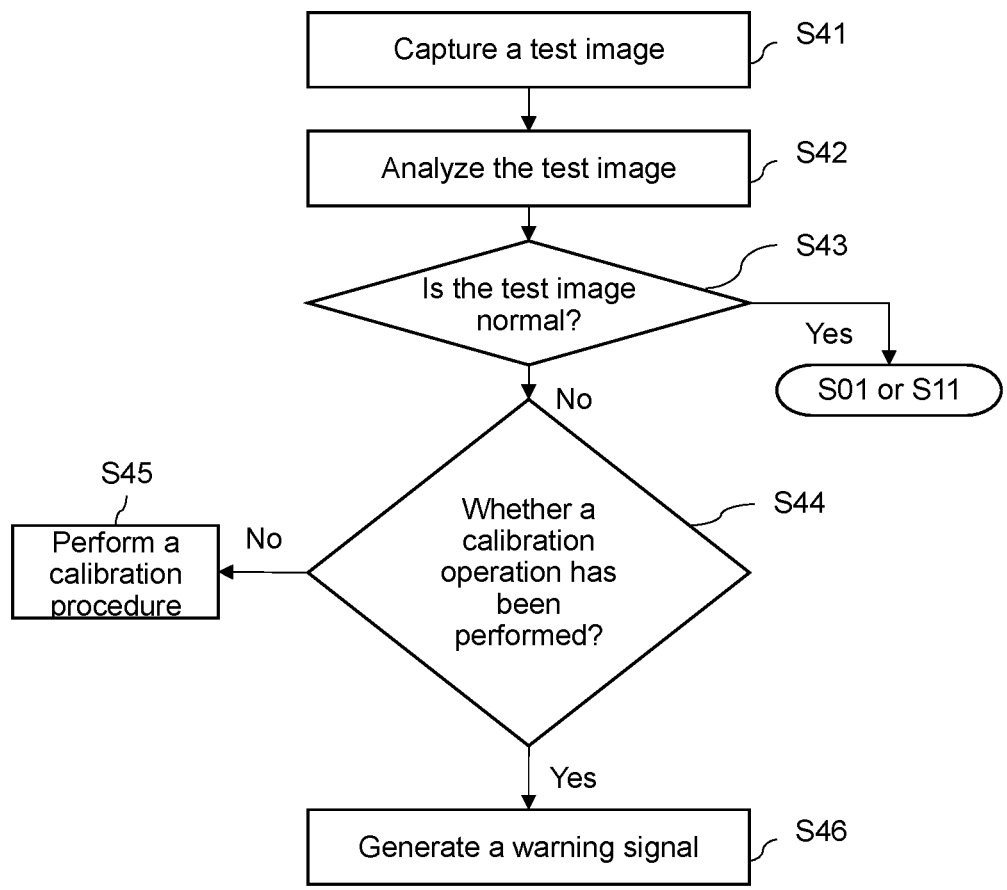
FIG. 12 is a flowchart of a test procedure according to another embodiment.

In another embodiment, referring to FIG. 1, FIG. 2 and FIG. 12, the processor 15 can also determine according to the test image whether a setting parameter of the photosensitive element 13 is normal (step S43). If the test image is normal (a determination result of "yes"), it means that the setting parameter of the photosensitive element 13 is normal, and the object surface detection system continues to subsequent step S01 or S11 to perform the position regulation procedure or the image capturing procedure. If the test image is abnormal (a determination result of "no"), it means that the setting parameter of the photosensitive element 13 is abnormal, and the processor 15 further determines whether the photosensitive element 13 has performed a calibration operation of the setting parameter thereof (step S44). If the photosensitive element 13 has performed the calibration operation of the setting parameter thereof (a determination result of "yes"), the processor 15 generates a warning signal indicating that the photosensitive element 13 is abnormal (step S46). If the photosensitive element 13 has not yet performed the calibration operation of the setting parameter thereof (a determination result of "no"), the object surface detection system then enters the calibration procedure described above (step S45). The processor 15 drives the photosensitive element 13 to perform the calibration operation of the setting parameter thereof in the calibration procedure (step S45). After the photosensitive element 13 has performed the calibration operation (step S45), the photosensitive element 13 captures another test image (step S41), and the processor 15 again determines whether the another test image captured after the photosensitive element 13 has performed the calibration operation is normal (step S43). If the processor 15 determines that the another test image is still abnormal (a determination result of "no"), the processor 15 next determines in step S44 that the photosensitive element 13 has performed the calibration operation (a determination result of "yes"), and the processor 15 generates the warning signal indicating that the photosensitive element 13 is abnormal (step S46).

In one embodiment, the setting parameter of the photosensitive element 13 includes a photosensitivity value, an exposure value, a focal length value, a contrast setting value, or any combination thereof. In some embodiments, the processor 15 can determine whether average brightness or contrast of the test image satisfies predetermined brightness to accordingly determine whether the above-mentioned setting parameters are normal. For example, if the average brightness of the test image does not satisfy the predetermined brightness, it means that one of the setting parameters of the photosensitive element 13 is incorrect, which renders the average brightness of contrast of the test image to not satisfy the predetermined brightness; if the average brightness or contrast of the test image satisfies the predetermined brightness, it means the every one of the setting parameters of the photosensitive element 13 is correct.

In some embodiments, the object surface detection system can further include an audio/video display unit; the warning signal can include video, audio, or audio and video, and the audio/video display unit can display the warning signal. Further, the object surface detection system can also have a networking function, and the processor 15 can send the warning signal by the networking function to a cloud terminal for storage or send the warning signal to another device by the networking function, such that the cloud terminal or a user of the another device learns that the photosensitive element 13 is abnormal to further debug the photosensitive element 13.

In one embodiment, in the calibration procedure (step S45), the photosensitive element 13 automatically adjusts the setting parameters in the calibration procedure according to a parameter configuration file. Herein, the parameter configuration file stores setting parameters of the photosensitive element 13. In some embodiments, an inspector can update the parameter configuration file such that the photosensitive element 13 automatically adjusts the parameters according to the parameter configuration file automatically updated in the calibration procedure, so as to correct any incorrect setting parameter.

In the foregoing embodiment, while the photosensitive element 13 captures an image (i.e., the test image or the detection image), the light source component 12 emits light L1 toward the detection position 14, and the light L1 illuminates the area currently located at the detection position 14 from an inclined direction or a lateral direction.

Figure 3:
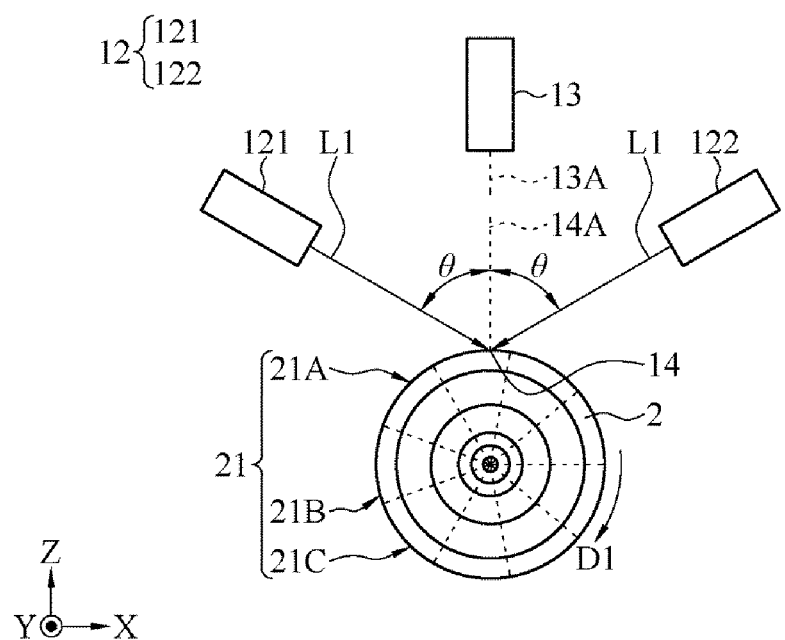
FIG. 3 is a schematic diagram of an implementation of relative optical positions of an object, a light source component and a photosensitive element.
Figure 4:
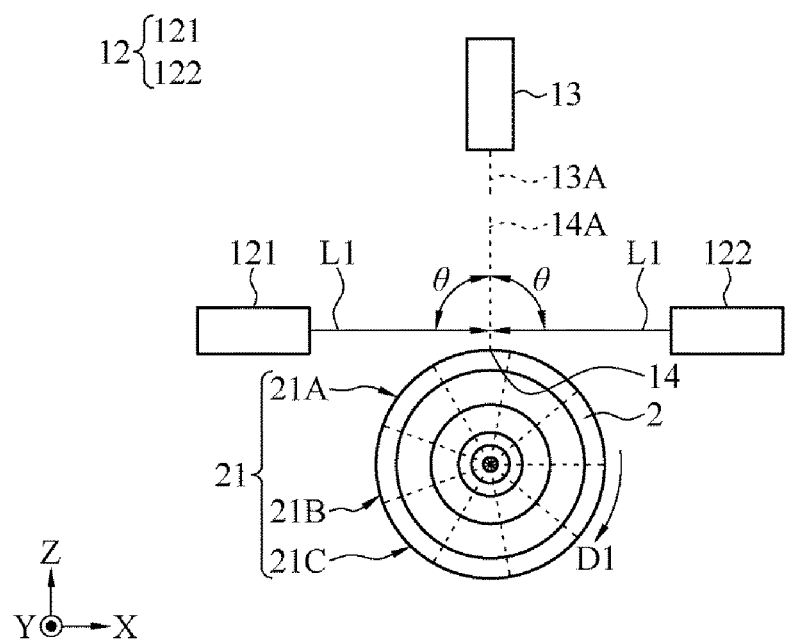
FIG. 4 is a schematic diagram of another implementation of relative optical positions of an object, a light source component and a photosensitive element.

Referring to FIG. 3 and FIG. 4, the light incident direction of the light L1 and a normal line 14A of the area located at the detection position 14 form an included angle (to be referred to as a light incident angle θ hereafter). That is, at the light incident end, an included angle between the optical axis of the light L1 and the normal line 14A is the light incident angle θ. In some embodiments, the light incident angle θ is more than 0 degree and less than or equal to 90 degrees; that is to say, the detection light L1 illuminates the detection position 14 with the light incident angle θ of more than 0 degree and less than or equal to 90 degrees relative to the normal line 14A, such that the area currently located at the detection position 14A is illuminated by the detection light L1 from a lateral direction or an inclined direction.

Figure 13:
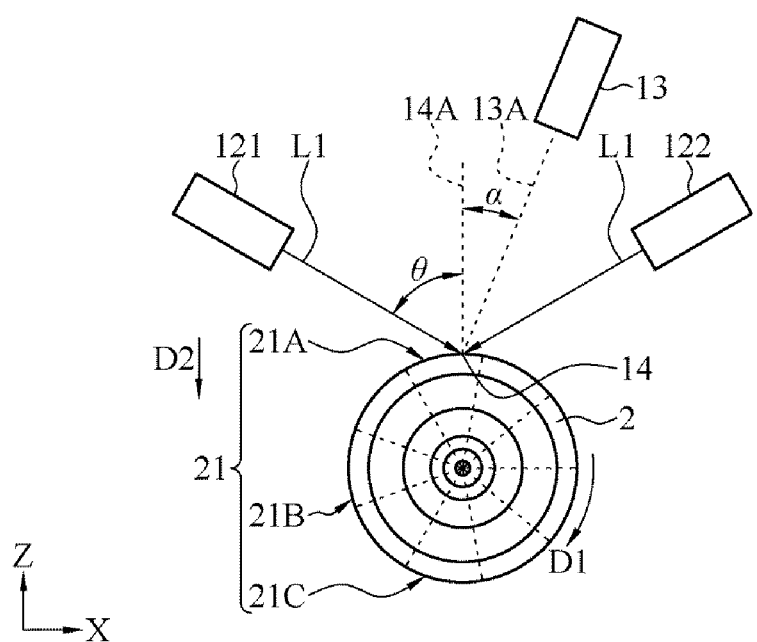
FIG. 13 is a schematic diagram of another implementation of relative optical positions of an object, a light source component and a photosensitive element.

In some embodiments, as shown in FIG. 3 and FIG. 4, a photosensitive axis 13A of the photosensitive element 13 is parallel to the normal line 14A; alternatively, as shown in FIG. 13, the photosensitive axis 13A of the photosensitive element 13 is between the normal line 14A and the first direction D1, i.e., an included angle α is present between the photosensitive axis 13A of the photosensitive element 13 and the normal line 14A. The photosensitive element 13 receives diffused light generated from the light received on the areas 21A to 21C, and the photosensitive element 13 captures, according to the diffused light, the detection images of the areas 21A to 21C sequentially located at the detection position 14 (step S14).

In some embodiments, according to the light incident angle θ of more than 0 degree and less than or equal to 90 degrees, that is, according to the detection light L1 that is laterally incident or incident at an inclination, if the surface 21 of the object 2 includes a grooved or holed surface structure, the detection light L1 cannot illuminate the bottom of the surface structure and the surface structure appears as a shadow in the image detection images of the areas 21A to 21C, hence forming detection images having apparent contrast between the surface 21 and a surface defect. Thus, the object surface detection system or an inspector can determine whether the surface 21 of the object 2 includes a defect according to the whether the detection image includes a shadow.

In some embodiments, according to different light incident angles θ, surface structures having different depths also present different brightness levels in the detection image. More specifically, as shown in FIG. 4, when the light incident angle θ is 90 degrees, the incident direction of the light L1 is perpendicular to the depth direction of a surface defect, i.e., the optical axis of the light L1 overlaps the tangent of the surface located in the middle of the detection position. At this point, regardless of the depth of the surface structure, the surface structure on the surface 21 is not illuminated by the detection light L1 due to being recessed and hence does not produce any reflected light or diffused light; that is, surface structures with deeper or shallower depths both present shadows in the detection image, such that the detection image has less obvious contrast or even nearly no contrast. As shown in FIG. 3, when the light incident angle θ is less than 90 degrees, the incident direction of the detection light L1 is not perpendicular to the depth direction of the surface structure. At this point, the detection light L1 illuminates partial regions of the surface structure below the surface 21, and the partial regions of surface structure receive illumination of the detection light L1 and produce reflected light and diffused light. Thus, the photosensitive element 13 receives the reflected light and diffused light from the partial regions of the surface structure, and surface structures present images with brighter borders (borders of protruding defects, for example) or darker borders (borders of recessed defects, for example) in the detection image, such that the detection image has better contrast.

Moreover, in a situation where the same light incident angle θ is less than 90 degrees, the photosensitive element 13 receives more reflected light and diffused light from shallower surface structures than from deeper surface structures. Thus, compared to a surface structure having a greater depth-width ratio, a shallower surface structure presents a brighter image in the detection image. Further, in a situation wherein the light incident angle θ is less than 90 degrees, as the light incident angle θ gets smaller, more reflected light and diffused light are produced in the surface structures, the surface structures present brighter images in the detection image, and the brightness presented by a shallower surface structure in the detection image is also greater than the brightness presented by a deeper surface structure in the image detection. For example, compared to a detection image corresponding to the 60-degree light incident angle θ, the surface structure presents higher brightness in a detection image corresponding to the 30-degree light incident angle θ In addition, in the detection image corresponding to the 30-degree light incident angle θ, a shallower surface structure presents higher brightness in the detection image compared to a deeper surface structure.

On this basis, the value of the light incident angle θ and the brightness presented by a surface structure in a detection image have a negative correlation relationship. As the light incident angle θ gets smaller, a shallower surface structure presents a brighter image in a detection image; that is to say, in a situation where the light incident angle θ is smaller, it become more difficult for the object surface detection system or the inspector to identify a shallower surface structure. In other words, it is easier for the object surface detection system or the inspector to identify a deeper surface structure according to a darker image. Conversely, as the light incident angle θ becomes larger, both a deeper surface structure and a shallower surface structure present darker images in a detection image; that is to say, the object surface detection system or the inspector is capable of identifying all surface structures in a situation where the light incident angle θ is larger.

Hence, the object surface detection system or the inspector can set the corresponding light incident angle θ according to a predetermined hole depth of a predetermined surface structure expected to be detected and the described negative correlation relationship. If detection for a predetermined deeper surface structure but not a predetermined shallower surface structure is desired, the light source adjustment component 16 can adjust the position of the light source component 12 according to the light incident angle θ calculated by using the described negative correlation relationship and thus set a smaller light incident angle θ. Further, the light source adjustment component 16 drives the light source component 12 to output the detection light L1, such that the predetermined shallower surface structure presents a brighter image in the detection image and the predetermined deeper surface structure presents a darker image in the detection image. If detection for both predetermined shallower and deeper surface structures is desired, the light source adjustment component 16 can adjust the position of the light source component 12 according to the light incident angle θ calculated by using the described negative correlation relationship and thus set a larger light incident angle θ (e.g., 90 degrees). Further, the light source adjustment component 16 drives the light source component 12 to output the detection light L1, such that the predetermined shallower and deeper surface structures both present shadows in the detection image.

For example, assuming that the object 2 is applied as a spindle of a safety belt component of an automobile, the foregoing surface structure can be a sand hole or an air hole caused by dust or air during the manufacturing process of the object 2, or a bump mark or a scratch, wherein the depth of the sand hole or the air hole is greater than that of the bump mark or the scratch. If detection for determining whether the object 2 contains sand holes or air holes is desired but detection for determining whether the object 2 contains bump marks or scratches is not needed, the light source adjustment component 16 can adjust the position of the light source component 12 according to the light incident angle θ calculated by using the described negative correlation relationship and thus set a smaller light incident angle θ, such that a sand hole or an air hole presents less higher brightness in the detection image, whereas a bump mark or a scratch presents higher brightness in the detection image, and the object surface detection system or the inspector can quickly identify whether the object 2 contains sand holes or air holes. If detection for determining whether the object 2 contains bump marks, scratches, sand holes and air holes is desired, the light source adjustment component 16 can adjust the position of the light source component 12 according to the light incident angle θ calculated by using the described negative correlation relationship and thus set a larger light incident angle θ, such that bump marks, scratches, sand holes and air holes all present shadows in the detection image.

Figure 14:
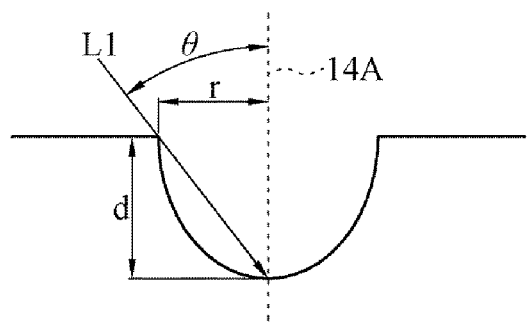
FIG. 14 is a schematic diagram of a surface type according to an embodiment.

In one embodiment, the light incident angle θ is associated with a predetermined aspect ratio of a predetermined surface defect to be detected. Referring to FIG. 14, taking a predetermined surface defect having a predetermined hole depth d and a predetermined hole radius r for example, the predetermined hole radius r is the distance between any lateral surface within the predetermined surface defect and the normal line 14A, and a ratio (r/d) of the predetermined hole radius r to the predetermined hole depth d is the aspect ratio (r/d) stated above, and the light incident angle θ is the arctangent (r/d). On this basis, the light source adjustment component 16 can adjust the position of the light source component 12 according to the aspect ratio (r/d) of the predetermined surface defect to be detected and thus set the light incident angle θ in step S03. Herein, the light incident angle θ needs to satisfy the conditions of being equal to or more than the arctangent (r/d) and less than or equal to 90 degrees, so as to obtain capturing effects of optimal target characteristics under the wavelength at which detection is to be performed. The light source adjustment component 16 drives the light source component 12 to output the detection light L1 after adjusting the position of the light source component 12. In some embodiments, the predetermined hole radius r can be set in advance according to the size of the surface structure expected to be detected at the object 2.

In one embodiment, the processor 15 can calculate the light incident angle θ according to the foregoing negative correlation relationship and the arctangent (r/d), and the processor 15 then drives the light source adjustment component 16 to adjust the position of the light source component 12 according to the light incident angle θ calculated.

In some embodiments, the light wavelength of the light L1 provided by the light source component 12 can range between 300 nm and 3000 nm. For example, the light wavelength of the light L1 can be within a light wave band of 300 nm to 600 nm, 600 nm to 900 nm, 900 nm to 1200 nm, 1200 nm to 1500 nm, 1500 nm to 1800 nm, or 1800 nm to 2100 nm. In one example, the light L1 provided by the light source component 12 can be visible light. Herein, the light L1 allows an image of a surface defect in a scale of submicron (μm) on the surface 21 to form in the detection image. Wherein, the light wavelength of the light L1 can range between 380 nm and 780 nm. In some embodiments, the light L1 can be visible light from any of white light, violet light, blue light, green light, yellow light, orange light and red light. In one embodiment, the light wavelength of white light ranges between 380 nm and 780 nm, the light wavelength of violet light ranges between 380 nm and 450 nm, the light wavelength of blue light ranges between 450 nm and 495 nm, the light wavelength of green light ranges between 495 nm and 570 nm, the light wavelength of yellow light ranges between 570 nm and 590 nm, the light wavelength of orange light ranges between 590 nm and 620 nm, and the light wavelength of red light ranges between 620 nm and 780 nm.

In some embodiments, the light L1 provided by the light source component 12 can be far infrared light (for example, having a light wavelength ranging between 800 nm and 3000 nm). Thus, the detection light L1 can allow an image of a surface type in a scale of submicron (e.g., 300 μm) on the surface of the object 2 to form in the detection image. Herein, when far infrared light is provided by the light source component 12 to illuminate light in an inclined direction on the object 2 having a surface attachment, the far infrared light is capable of passing through the surface of the object 2, enabling the photosensitive element 13 to capture the surface image of the object 2 under the attachment. In other words, the far infrared light is capable of passing through the surface attachment of the object 2, enabling the photosensitive element 13 to obtain an image of the surface 21 of the object 2. In some embodiments, the light wavelength of the far infrared light is more than 2 μm. In some embodiments, the light wavelength of the far infrared light is more than the thickness of the attachment. Preferably, the light wavelength of the far infrared light is more than 3.5 μm. In some embodiments, the object 2 is preferably a metal material. In some embodiments, the attachment can be grease, stains, or color paint. In one example, the wavelength of the far infrared light can be adjusted according to the thickness of an attachment needing to be passed through. Further, the wavelength of the far infrared light can also be adjusted according to the surface type of the object 2 to be tested, thereby performing image filtering for micron (μm) structures. For example, if the surface of a sample has a small and long scratch or sand hole of 1 μm to 3 μm, which however does not affect the product quality, and structural defects that quality control staff are concerned about are structural defects of more than 10 μm, the wavelength of the far infrared light L1 selected can be an intermediate wavelength (e.g., 4 μm) so as to achieve optimal filtering effects for micron structure images and low-noise image quality without affecting the detection for defects in larger sizes.

In some embodiments, the light source component 12 can have a wider light wave band, and at this point, the image scanning system provides on a light incident path or a light absorbing path a spectroscopic component (not shown) allowing light of certain light wave bands to pass through to further generate the light L1 (or reflection light of the light L1) of a required light wavelength.

In one embodiment, the processor 15 can drive the light source adjustment component 16 to adjust the light intensity of the far infrared light L1 emitted from the light source component 12, so as to alleviate the issue of glare and further improve the quality of detection images captured by the photosensitive element 13, thereby obtaining low-disturbance penetrating images. For example, the light source adjustment component 16 can reduce the light intensity, enabling the photosensitive element 13 to obtain a detection image with less glare.

In another embodiment, according to different light incident angles θ, surface defects having different depth present different levels of brightness in a detection image, and the intensity of glare produced by the far infrared light L1 also changes. In other words, the processor 15 can drive the light source adjustment component 16 to adjust the light incident angle θ of the far infrared light L1 emitted from the light source component 12, so as to effectively reduce glare and further improve the quality of detection images captured by the photosensitive element 13, thereby obtaining low-disturbance penetrating images.

In another embodiment, the light source component adjustment component 16 can determine a polarization direction of light waves of the far infrared light L1 emitted from the light source component 12, which is equivalently controlling the light source component 12 to output polarized detection far infrared light L1, so as to effective reduce glare and further improve the quality of detection images captured by the photosensitive element 13, thereby obtaining low-disturbance penetrating images.

Figure 15:
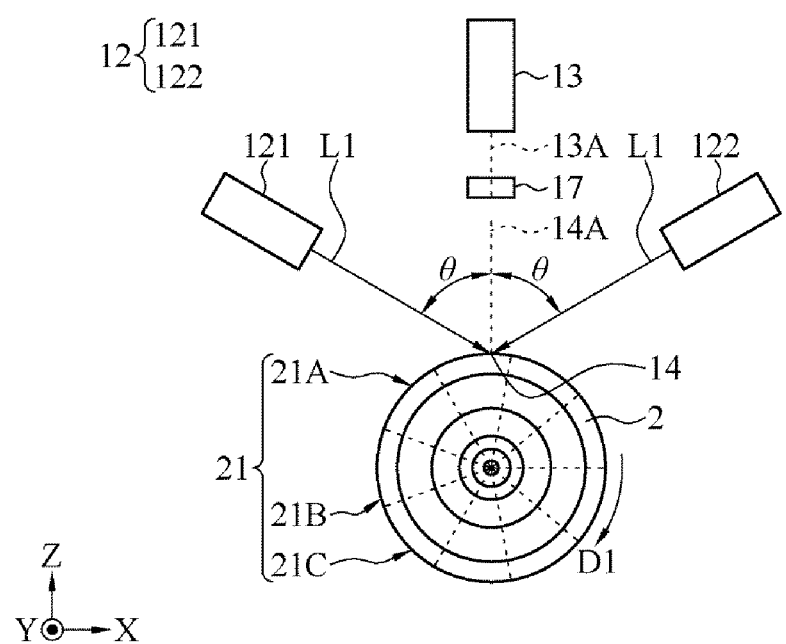
FIG. 15 is a schematic diagram of another implementation of relative optical positions of an object, a light source component and a photosensitive element.

In some embodiments, referring to FIG. 15, the object surface detection system can further include a polarizing plate 17. The polarizing plate 17 is located on the optical axis 13A of the photosensitive element 13 and is configured between the photosensitive element 13 and the detection position 14. Herein, the photosensitive element 13 performs image capturing of the surface of the object 2 though the polarizing plate 17, and saturation glare caused upon the photosensitive element 13 due to strong far infrared light can be effectively prevented by using the polarizing plate 17, thereby improving the quality of detection images captured by the photosensitive element 13 and hence obtaining low-disturbance penetrating images.

In one embodiment, as shown in FIG. 1, the object 2 is cylindrical in shape, such as a spindle. That is, the body 201 of the object 2 is cylindrical in shape. Herein, the surface 21 of the object 2 can be a lateral surface of the body 201 of the object 2, that is, the surface 21 is a cylindrical surface and has a radian of 2π. Herein, the extension direction D1 can be a clockwise direction or a counterclockwise direction with respect to the long axis of the body of the object 2 as a rotation axis. In some embodiments, one end of the object 2 is a narrower and smaller structure compared to the opposite end. In one example, the carrier element 111 can be two rollers spaced by a predetermined distance, and driver motor 112 is coupled to rotating shafts of the two rollers. Herein, the predetermined distance is less than the diameter of the object 2 (the minimum diameter of the body). Thus, in the detection procedure, the object 2 can be movably arranged between the two rollers. Further, while the driver motor 112 rotates the two rollers, the object 2 is driven and hence rotated by the rollers due to the surface frictional force between the object 2 and the two rollers and is thus rotated along the first direction D1 of the surface 21, thus aligning an area to the detection position 14. In another example, the carrier element 111 can be a rotating shaft, and the driver motor 112 is coupled to one end of the rotating shaft. At this point, the other end of the rotating shaft has an embedding member (e.g., an insertion hole). At this point, in the detection procedure, the object 2 is removably embedded in the embedding member. Further, while the driver motor 112 rotates the rotating shaft, the object 2 is driven by the rotating shaft and is rotated along the first direction D1 of the surface 21, thus aligning an area to the detection position 14. In some embodiments, assuming that the surface 21 is divided into nine surface areas 21A to 21C for example, the driver motor 112 drives the carrier element 111 to rotate by 40 degrees each time, such that the object 2 is driven to rotate along the first direction D1 of the surface 21 by 40 degrees. In some embodiments, the rotation angle (for fine tuning the position of the object 2) of the driver motor 112 in step S13 is less than the rotation angle (for moving the next area to the detection position 14) of the driver motor 112 in step S15.

Figure 16:
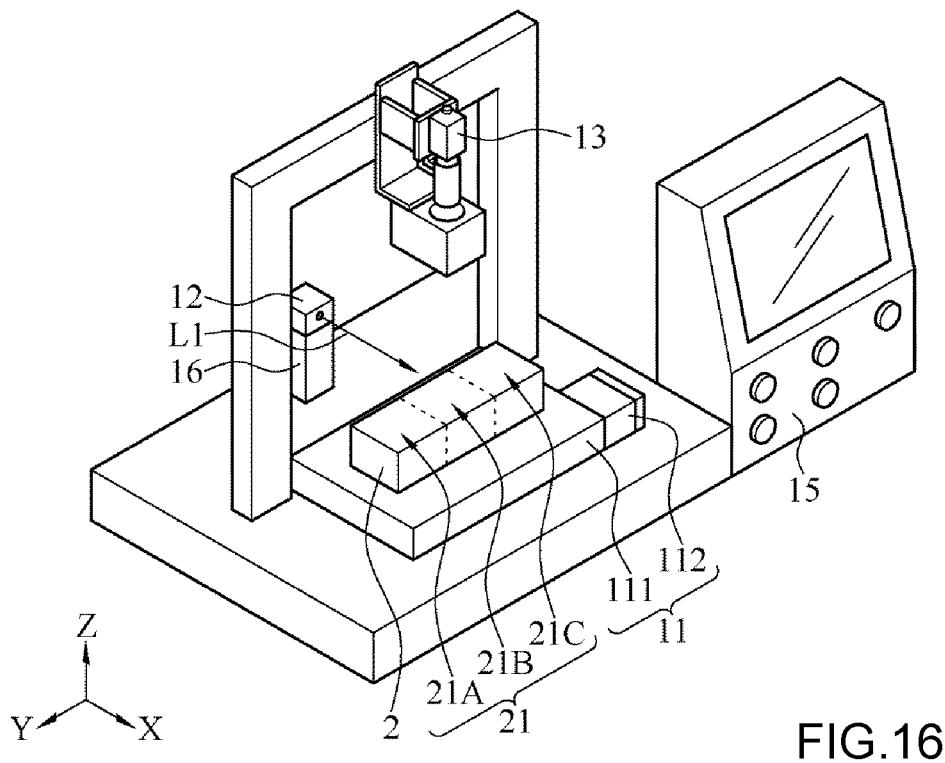
FIG. 16 s a schematic diagram of an object surface detection system according to another embodiment of the present invention.

In one embodiment, as shown in FIG. 16, the object 2 is plate-like in shape. That is, the body 201 of the object 2 has a planar surface. The surface 21 (i.e., the planar surface of the body 201) of the object 2 is a non-curved surface having a curvature of equal to zero or approximately equal to zero. Herein, the first direction D1 can be an extension direction of any side (e.g., the long side) of the surface 21 of the object 2. In one example, the carrier element 111 can be a planar carrier board, and the driver motor 112 is coupled to one side of the planar carrier board. At this point, the object 2 can be removably arranged on the planar carrier board in the detection procedure. The driver motor 112 drives the planar carrier board to move along the first direction D1 of the surface 21 so as to drive and move the object 2, thus aligning an area to the detection position 14. Herein, the driver motor 112 drives the planar carrier board to move by a predetermined distance each time, and sequentially moves each of the areas 21A to 21C to the detection position 14 by repeatedly driving the planar carrier board. Herein, the predetermined distance is substantially equal to the width of each of the areas 21A to 21C along the first direction D1.

In some embodiments, the driver motor 112 can be a step motor.

In one embodiment, as shown in FIG. 1 and FIG. 16, the light source component 12 can include a light emitting element. In another embodiment, as shown in FIG. 3 and FIG. 4, the light source component 12 can include two light emitting elements 121 and 122, and the two light emitting elements 121 and 122 are symmetrically arranged on two opposite sides of the object 2 relative to the normal line 14A. The two light emitting elements 121 and 122 individually illuminate the detection position 14, and the surface 21 is illuminated by the symmetrical detection light L1 such that symmetrical diffused light is produced. The photosensitive element 13 sequentially captures the detection image of each of the areas 21A to 21C located at the detection position 14 according to the symmetrical diffused light, hence enhancing the imaging quality of the detection image. In some embodiments, each of the light emitting elements 121 and 122 can be implemented by one or more light emitting diodes (LED); in some embodiments, each of the light emitting elements 121 and 122 can be implemented by a laser light source.

In one embodiment, the object surface detection system can include one single light source component 12, as shown in FIG. 1 and FIG. 16.

Figure 17:
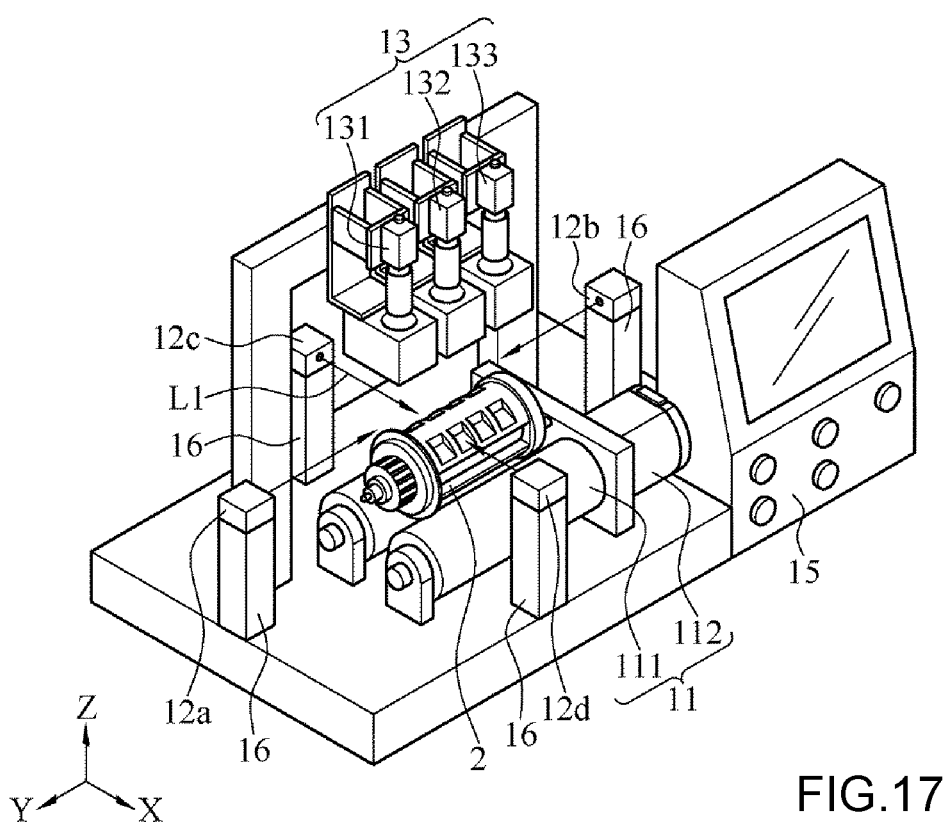
FIG. 17 s a schematic diagram of an object surface detection system according to another embodiment of the present invention.

In another embodiment, referring to FIG. 17, the object surface detection system can include multiple light source components 12a, 12b, 12c and 12d. The light source components 12a, 12b, 12c and 12d are respectively located in different directions from the detection position 14, that is, located in different directions from the carrier element 111 of the object 2 carried. For example, the light source component 12a can be arranged on the front side of the detection position 14 (or the carrier element 111), the light source component 12b can be arranged on the rear side of the detection position 14 (or the carrier component 111), the light source component 12c can be arranged on the left side of the detection position 14 (or the carrier element 111), and the light source component 12d can be arranged on the right side of the detection position 14 (or the carrier component 111).

Herein, under the lighting of each light source component (any one of 12a, 12b, 12c and 12d), the object surface detection system performs the image capturing procedure once, so as to obtain the detection images MB of all the areas 21A to 21C of the object 2 under a specific lighting direction. For example, assume that the object surface detection system first has the light source component 12a emit the light L1. Under the light L1 emitted from the light source component 12a, the photosensitive element 13 captures the detection images MB of all the areas 21A to 21C of the object 2. Then, the object surface detection system switches to the light source component 12b to emit the light L1. Under the light L1 emitted from the light source component 12b, the photosensitive element 13 similarly captures the detection images MB of all the areas 21A to 21C of the object 2. Next, the object surface detection system switches to the light source component 12c to emit the light L1. Under the light L1 emitted from the light source component 12c, the photosensitive element 13 similarly captures the detection images MB of all the areas 21A to 21C of the object 2. Next, the object surface detection system switches to the light source component 12d to emit the light L1. Under the light L1 emitted from the light source component 12d, the photosensitive element 13 similarly captures the detection images MB of all the areas 21A to 21C of the object 2.

In one embodiment, referring to FIG. 16, the object surface detection system can be provided with one single photosensitive element 13, and the photosensitive element 13 performs image capturing of multiple areas 21A to 21C so as to obtain multiple detection images respectively corresponding to the areas 21A to 21C. In another embodiment, referring to FIG. 1 and FIG. 17, the image scanning system can be provided with multiple photosensitive elements 13, and these photosensitive elements 13 face the detection position 14 and are arranged along the long axis of the object 2. These photosensitive elements 13 respectively capture detection images of areas located at the detection position 14 for different sections of the object 2.

In one example, assuming that the object 2 is cylindrical in shape and the image scanning system is provided with one single photosensitive element 13. The photosensitive element 13 can perform image capturing of multiple areas 21A to 21C of the body (i.e., the middle section) of the object 2 to obtain multiple detection images MB respectively corresponding to the areas 21A to 21C, and the processor 15 then combines the detection images MB of the areas 21A to 21C into an object image IM, as shown in FIG. 9.

Figure 18:
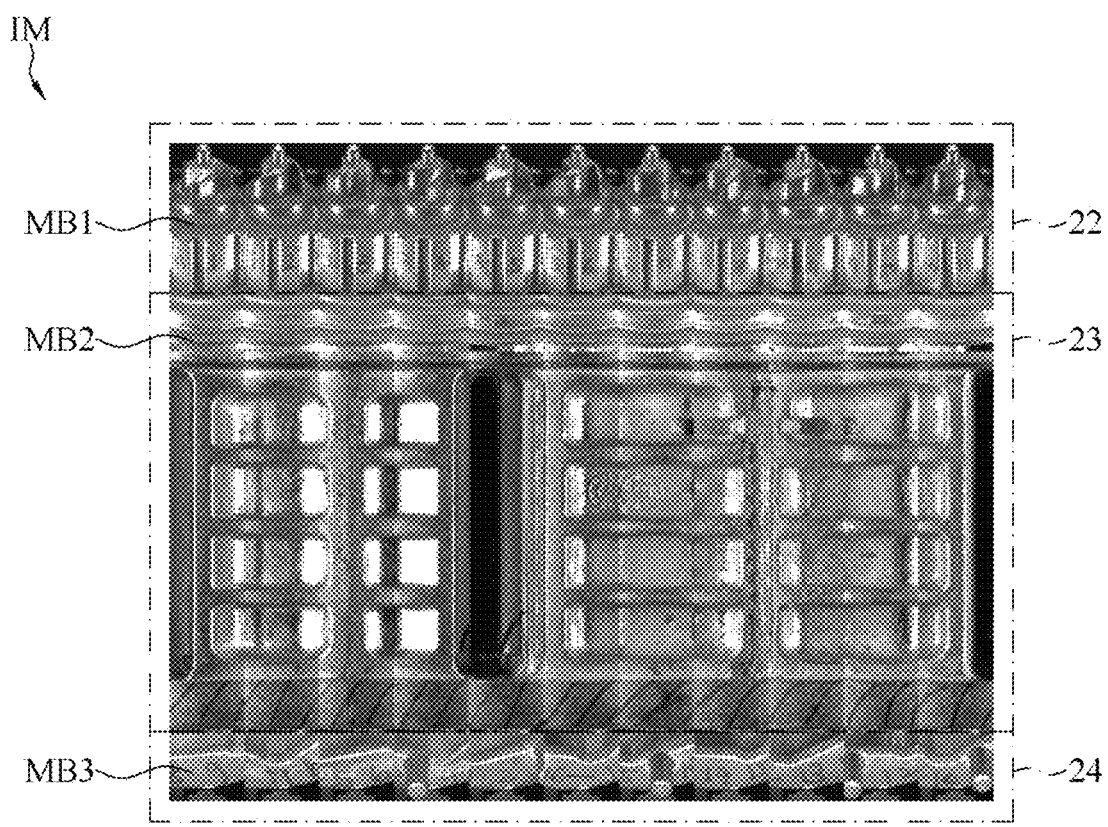
FIG. 18 is a schematic diagram of an object image according to another embodiment.

In another example, assume that the object 2 is cylindrical in shape and the image scanning system is provided with multiple photosensitive elements 131 to 133, as shown in FIG. 1 and FIG. 16. These photosensitive elements 131 to 133 respectively capture detection images MB1 to MB3 of different section positions of the surface of the object 2 located the detection position 14, and the processor 15 then combines all the detection images MB1 to MB3 into the object image IM, as shown in FIG. 18. For example, assume that the photosensitive elements 131 to 133 are in a quantity of three, and the processor 15 combines the detection images MB1 to MB3 captured by the photosensitive elements 131 to 133 into the object image IM of the object 2, as shown in FIG. 18. Wherein, the image object IM includes a sub object image 22 (the upper part of the object image IM in FIG. 18) combined from the detection images MB1 of all the areas 21A to 21C captured by the first photosensitive element 131 among the three photosensitive elements 13, a sub object image 23 (the middle part of the object image IM in FIG. 18) combined from the detection images MB2 of all the areas 21A to 21C captured by the second photosensitive element 132 among the three photosensitive elements 13, and a sub object image 24 (the lower part of the object image IM in FIG. 18) combined from the detection images MB3 of all the areas 21A to 21C captured by the third photosensitive element 133 among the three photosensitive elements 13.

In some embodiments, the processor 15 can automatically determine according to the object image obtained whether the surface 21 of the object 2 contains surface defects, whether the surface 21 has different textures, and whether the surface 21 has attachments such as paint or grease; that is, the processor 15 can automatically determine different surface types of the object 2 according to the object image. More specifically, the processor 15 includes an artificial neural network system, and the artificial neural network system has a learning phase and a prediction phase. In the learning phase, the object image inputted into the artificial neural network system is a known surface type (i.e., an existing target surface type already labeled thereon), and the artificial neural network system performs deep learning according to the known surface type and a surface type category (to be referred to as a predetermined surface type hereafter) of the known surface type so as to build a predictive model (that is, formed by a plurality of hidden layers, wherein each hidden layer has one or more neurons, and each neuron performs one determination item). In other words, in the learning phase, determination items of individual neurons are generated and/or weightings connecting any neurons are adjusted by using object images of known surface types, such that a prediction result (i.e., a predetermined surface type category outputted) of each object image matches a known surface type that is labeled as learned.

For example, the surface type can be exemplified by sand holes or air holes, bump marks or scratches, and an image block presenting different surface types can be an image block imaged with sand holes of different depths, an image block imaged without sand holes but with bump marks or scratches, an image block imaged with different levels of surface roughness, an image block imaged without any surface defects, an image block imaged with a surface type presenting different aspect ratios due to different contrast levels produced by illuminating the areas 21A to 21C by the detection light L1 having different light wavelengths, or an image block imaged with attachment of different colors. In the learning phase, the artificial neural network system performs deep learning according to the object images of different surface types, so as to build a predictive model for identifying various surface types. Further, the artificial neural network system can categorize object images having different surface types to generate different predetermined surface type categories in advance. Thus, in the prediction phase, after the object image is inputted into the artificial neural network system, the artificial neural network system executes the predictive model according to the object image inputted so as to identify in the object image the object image presenting the surface type of the object 2. The predictive model categorizes the object image of the surface type of the object according to a plurality of predetermined surface types. In some embodiments, at an output terminal of the predictive model, the predictive model can perform percentile prediction on the object image according to predetermined surface defect categories, i.e., predicting the percentage of the possibility that the object image falls into the individual categories.

For instance, taking the areas 21A to 21C for example, the artificial neural network system executes the predictive model according to the combined object images of the areas 21A to 21C, and can use the object image of the object 2 to identify that the area 21A contains sand holes and bump marks, the area 21B does not contain any surface defects, the area 21C contains sand holes and paint, and the surface roughness of the area 21A is greater than the surface roughness of the area 21C. Next, assuming that there are six categories of predetermined surface type categories, namely, containing sand holes or air holes, containing scratches or bump marks, having a high level of roughness, having a low level of roughness, having an attachment, and without any surface defects, the artificial neural network system can categorize the detection image of the area 21A to the predetermined category of containing sand holes or air holes and containing scratches or bump marks, categorize the detection image of the area 21B to the predetermined category of without any surface defects, and categorize the detection image of the area 21C to the predetermined category of containing sand holes or air holes and the predetermined type of having an attachment, and can further categorize the detection image of the area 21A to the predetermined category of having a high level of roughness, and categorize the detection images of the areas 21B and 21C to the predetermined category of having a low level of roughness. Herein, by identifying different surface types using the artificial neural network system, the efficiency of detection is significantly enhanced, and the probability of human misjudgment is also reduced.

In one embodiment, the deep learning performed by the artificial neural network system can be implemented by, for example but not limited to, a convolutional neural network (CNN).

In conclusion, the method for regulating a position of an object according to embodiments of the present invention uses images to analyze a presentation type and a presentation position of a specific structure of the object in the test image to determine whether the object is aligned, thereby capturing a detection image of each of the areas on the surface located at the same position according to the aligned object. Thus, an artificial neural network system can build a more accurate predictive model according to the detection images of the same position, further reducing the possibility of misjudgment.

The present disclosure is explained by way of the disclosed embodiments that are not to be construed as limitations to the present disclosure. Without departing from the spirit and purview of the present disclosure, a person of ordinary skill in the art could make slight modifications and amendments. Therefore, the protection scope of the present disclosure is to be accorded with the broadest interpretation of the appended claims.

What is claimed is:
1. A method for regulating a position of an object, suitable for regulating the position of the object, the method comprising:
    detecting a plurality of first alignment structures under rotation of the object, wherein a plurality of second alignment structures of the object sequentially face a photosensitive element during the rotation of the object; and when the plurality of first alignment structures have reached a predetermined state, stopping the rotation of the object and performing an image capturing procedure of the object, wherein the image capturing procedure of the object comprises:

capturing a test image of the object by the photosensitive element, wherein the test image includes an image block presenting a second alignment structure currently facing the photosensitive element;

detecting a presentation position of the image block in the test image;

when the presentation position is located in the middle of the test image, capturing a detection image of the object by the photosensitive element; and when the presentation position is not located in the middle of the test image, moving the object in a first direction, and returning to the step of capturing the test image of the object by the photosensitive element.

2. The method for regulating a position of an object according to claim 1, wherein the plurality of second alignment structures are arranged at intervals along the first direction, and a distance between any two adjacent of the second alignment structures is greater than or equal to a viewing angle of the photosensitive element.

3. The method for regulating a position of an object according to claim 1, wherein the object is cylindrical in shape, and the first direction is a clockwise direction.

4. The method for regulating a position of an object according to claim 1, wherein the object is cylindrical in shape, and the first direction is a counterclockwise direction.

5. The method for regulating a position of an object according to claim 1, wherein the object is planar in shape.

6. The method for regulating a position of an object according to claim 1, wherein the step of performing the image capturing procedure of the object further comprises:

after the step of capturing the detection image of the object by the photosensitive element, moving the object such that the next second alignment structure faces the photosensitive element, and returning to the step of capturing the test image of the object by the photosensitive element, until the plurality of corresponding detection images have been captured according to the second alignment structures.

7. The method for regulating a position of an object according to claim 6, wherein the step of performing the image capturing procedure of the object further comprises:

after having captured the plurality of corresponding detection images, combining the plurality of detection images into an object image by the processor.

8. The method for regulating a position of an object according to claim 6, wherein the step of performing the image capturing procedure of the object further comprises:

after having captured the plurality of corresponding detection images, capturing, based on a short side of each of the detection images, a middle section of each of the detection images, and combining the plurality of middle sections into the object image.

9. A method for regulating a position of an object, suitable for regulating the position of the object, the method comprising:

sequentially moving a plurality of blocks of a surface of the object to a detection position, wherein the object comprises a plurality of alignment structures;

capturing a detection image of each of the blocks of the surface sequentially located on the detection position by a photosensitive element, wherein the photosensitive element faces the detection position and the plurality of alignment structures are located within a viewing angle of the photosensitive element;

combining the captured detection images of the plurality of blocks of the surface into an object image;

comparing the object image with a predetermined pattern; and if the object image does not match the predetermined pattern, adjusting a sequence of combining the plurality of detection images.

10. The method for regulating a position of an object according to claim 9, wherein the plurality of alignment structures is located on one end of a body of the object.

11. The method for regulating a position of an object according to claim 9, wherein the body is cylindrical in shape, and a surface of the body are divided in a clockwise direction into the plurality of blocks.

12. The method for regulating a position of an object according to claim 9, wherein the body has a planar surface.

13. The method for regulating a position of an object according to claim 9, wherein the step of sequentially moving the plurality of blocks of the surface of the object to the detection position comprises:

carrying the object by a carrier element at the detection position, and rotating the carrier element to drive the object to rotate.

14. The method for regulating a position of an object according to claim 9, wherein the step of sequentially moving the plurality of blocks of the surface of the object to the detection position comprises:

carrying the object by a carrier element at the detection position, and moving the carrier element horizontally to drive the object to move.

* * * * *